United States Patent [19]

Adachi et al.

[11] Patent Number: 4,886,377

[45] Date of Patent: Dec. 12, 1989

[54] ROTARY BODY OF HARD MATERIAL WITH PLASTIC SUPPORTER

[75] Inventors: Minoru Adachi, Ikoma; Takashi Kizawa, Kyoto, both of Japan

[73] Assignee: Adachishin Industrial Co., Ltd., Osaka, Japan

[21] Appl. No.: 134,129

[22] Filed: Dec. 17, 1987

[30] Foreign Application Priority Data

Dec. 18, 1987 [JP] Japan .................................. 61-302456

[51] Int. Cl.[4] ...................... F16C 43/06; F16C 29/04; F16C 33/46
[52] U.S. Cl. ................................. 384/49; 29/149.5 B; 384/50; 384/91; 384/445; 384/523; 384/548; 384/627
[58] Field of Search .................... 384/7, 49, 50–52, 384/56, 91, 445, 456, 490, 523, 526–528, 534, 548, 549, 572, 573, 576, 614, 623, 627; 29/149.5 R, 149.5 B, 149.5 NM

[56] References Cited

U.S. PATENT DOCUMENTS

| | | | |
|---|---|---|---|
| 3,161,449 | 12/1964 | Flom | 384/282 |
| 4,223,963 | 9/1980 | Glodin et al. | 384/527 |
| 4,492,415 | 1/1985 | Baile et al. | 384/523 X |
| 4,494,802 | 1/1985 | Henson | 384/19 |

FOREIGN PATENT DOCUMENTS

| | | | |
|---|---|---|---|
| 28925 | 8/1971 | Japan | 384/548 |
| 26543 | 7/1972 | Japan | 384/499 |
| 2136887 | 9/1984 | United Kingdom | 384/490 |

Primary Examiner—Hannon Thomas R.
Attorney, Agent, or Firm—Edwin E. Greigg

[57] ABSTRACT

A rotary body of hard material with a plastic supporter and a method of manufacturing therefor, which essentially comprises a coating film coated with the rotary body and removed after molding so as to make a clearance between the rotary body and the supporter, so that rotation of the rotary body may be allowed smoothly. The method of this invention defines steps of molding, coating of film and removing of the film so as to obtain rotation of rotary body relative to the plastic supporter.

15 Claims, 4 Drawing Sheets

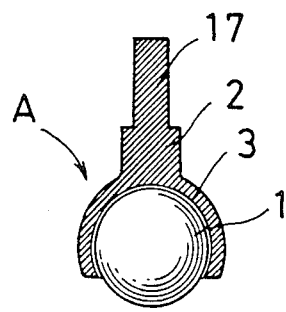
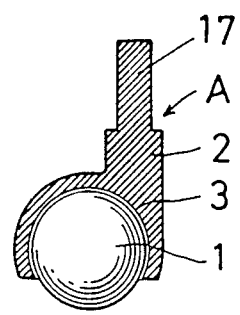
Fig.15  Fig.16
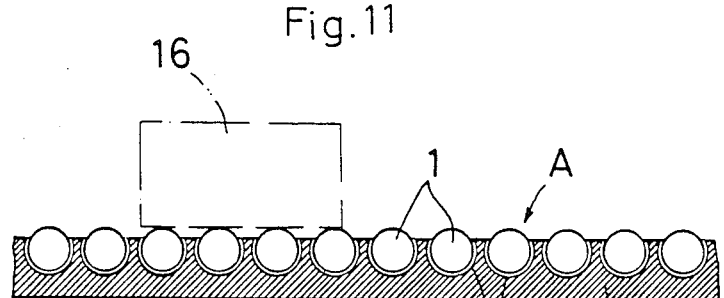
Fig.11
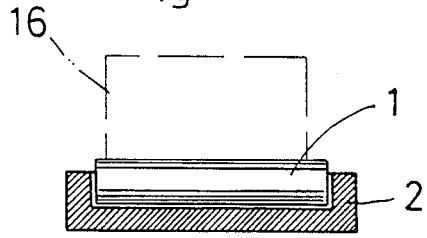
Fig.12
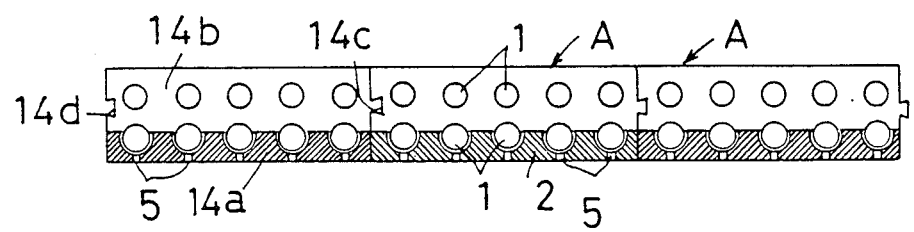
Fig.10

ROTARY BODY OF HARD MATERIAL WITH PLASTIC SUPPORTER

BACKGROUND OF THE INVENTION

1. Field of the Invention

The present invention relates to a rotary body of hard material with a plastic supporter and a method of manufacturing therefor, which comprises a metal or ceramic product such as a sphere or column and a plastic supporter which supports the metal or ceramic product rotatably in locating around the product or which is rotatably supported by the metal or ceramic product in relation thereto. The metal or ceramic products are those such as bearings including ball bearings, roller bearings and the like, conveyers including ball conveyers, roller conveyers and the like, chains including ball-connection chains, roller-connection chains and the like, gears with shafts, rotary members with a shaft such as a pulley, casters including ball casters, roller casters and the like, and other bearings used for any kind of apparatus and machines.

2. Description of the Prior Art

In the present invention, a column body defines the column body including a shaft and those which have a spherical portion or a column portion having a large diameter portion at an intermediate portion thereof or at the end portions thereof. A rotary body of hard material defines means that includes not only those rotatable with respect to a supporter therefor, but also those such as a gear having a shaft or a shaft with a pulley which are not rotatable per se in the state of use but rotatable around the shaft thereof. In other words, the rotary body of hard material includes those which are rotatable relative to the plastic supporter which is located on the periphery of the rotary body of hard material.

This kind of rotary body of hard material with the supporter in the prior art is now described with reference to FIG. 1(c) showing an embodiment of the present invention. In order to prevent a sphere body 1 from falling down by surrounding the entire periphery of an intermediate portion of a supporter by leaving its upper and lower surface exposed, it had to take such a construction that the supporter comprises two members which are divided into upper and lower portions by a central line of the spherical body 1 and a semi-spherical opening or hole had to be formed with each of the two members so as to hold the spherical body 1 in the upper and lower directions and support same.

However, as described hereinafter in the embodiment of the present invention, a clearance 3 necessary for rotation of the spherical body 1 is sufficient to be micron size. When the clearance 3 becomes large, the spherical body 1 chatters and does not rotate smoothly. As a result, such a construction of the clearance 3 and the spherical body 1 cannot be used for a precision machine.

Further, in order to form such a micron clearance 3 between the spherical body 1 and the supporter 2, it is necessary to form an extremely precise opening or hole of a hemisphere with each of the supporters 2, which are divided into two pieces. Particularly, it is troublesome to fit and fix the upper and lower supporters 2 by holding the spherical body 1 without shifting their own positions. When precise fitting of the supporters 2 is not carried out in such a state that there is no shifting of the supporter 2 in any direction of 360° of the hole, the spherical body 1 does not rotate smoothly and sometimes does not rotate completely.

SUMMARY OF THE INVENTION

The present invention has an object to solve the above-mentioned problems in the prior art and provide a precise rotary body of hard material and a method of manufacturing a clearance between the rotary body of hard material and the supporter precisely so as to solve the disadvantages in the prior art. body of hard material with a plastic supporter according to the first invention, comprises a rotary body of hard material in the shape of a sphere or column and a plastic supporter which is superior in unit-wearness and smoothness and supports the rotary body of hard material or is supported thereby, characterized in that the supporter surrounds the periphery of the rotary body of hard material seamlessly which periphery is sufficient for preventing the rotary body of hard material from separating from the plastic supporter by leaving a part of the rotary body of hard material exposed, and that a very small clearance is made between the rotary body of hard material and a surface of the plastic supporter surrounding the rotary body of hard material by removing a coating film formed with the periphery of the rotary body of hard material.

The method of manufacturing the rotary body of hard material with the plastic supporter according to the invention comprises the steps of forming a coating film with the entire periphery of the rotary body of hard material of a sphere or column or a part thereof which is to be molded, disposing and fixingly supporting the rotary body of hard material with the coating film in plastic forming dies, surrounding the entire periphery of the rotary body of hard material with an injected plastic material tightly except a surface portion of the rotary body of hard material supported by the dies, taking out the rotary body of hard material with the plastic supporter from the dies and removing the coating film by means of a solvent for making a clearance between the rotary body of hard material and the plastic supporter.

The rotary body of hard material with the plastic supporter, which is manufactured in the above-mentioned manner, may be provided with a desired small clearance of substantially micro size between the rotary body of hard material and the plastic supporter, which micron size almost corresponds to the coating film, by selecting and adjusting the size of the rotary body of hard material, thickness of the coating film, coefficient of heat expansion of its material, coefficient of heat expansion of the injection plastic material, and forming temperature and then it becomes possible to provide the rotary body of hard material with the plastic supporter which has a surface of an opening or hole in high precision, which corresponds to precision of the surface of the coating film.

As is clear from the above-mentioned description, the present invention has the following advantages.

Namely, the present invention reveals that the rotary body of hard material of a sphere or column is coated with a coating film before the molding process by using a plastic material and that the rotary body of hard material is seamlessly surrounded with the plastic to make one body except a desired part thereof, and that a very small clearance is made between the rotary body of hard material and the plastic mold by removing the coating film after plastic formation of the plastic supporter. Therefore, the product may be provided with the plastic supporter having a very small surrounding surface in micron size corresponding to the outer shape of the coating film. As the result, the rotary body of hard material with the plastic supporter is adapted for mass production and keeps its quality constant.

Thus, the product manufactured in such a manner, may keep not only its quality constant, but also smoothness of rotation for a long time since the plastic supporter is made to seamlessly form one body.

Other advantages of the present invention will be apparent from the description of embodiment with reference to the drawings.

BRIEF DESCRIPTION OF THE DRAWINGS

The drawings show embodiments of a rotary body of hard material with a plastic supporter according to the present invention in which:

FIG. 10 is a side view of the ball conveyer block broken away at a center line, FIG. 11 is a side view of a roller conveyer broken away at a center line, FIG. 12 is a front view of the roller portion broken away at a center line, FIG. 15 and FIG. 16 are side views of a caster broken away at a center line, respectively.

DETAILED DESCRIPTION OF THE PREFERRED EMBODIMENTS

Figure 1A:
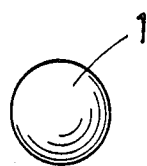
FIG. 1(a) through FIG. 1(d) are elevational views partly broken away, showing forming processes with the passage of time.
Figure 1B:
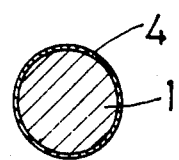
Figure 1C:
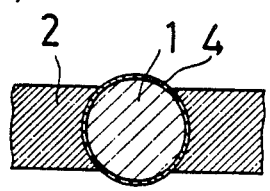
Figure 1D:
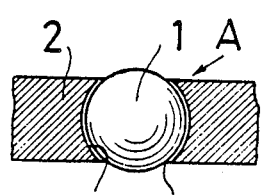

The embodiments of the present invention will now be described with reference to the drawings.

(First Embodiment)

Each of FIGS. 1(a), 1(b), 1(c) and 1(d) show an embodiment of this invention with the passage of time and the first invention is then described below with reference to these drawings.

Numeral 1 shows a steel ball, numeral 2 is a plastic supporter, numeral 3 is a small clearance obtained in this embodiment and numeral 4 is a copper plating film.

| The steel ball | Degree of circle | 0.5 μ |
| --- | --- | --- |
|  | Size(Diameter) | 10.0 mm |
| Film | Copper plating thickness of film | 8 μ |
| Forming material | Thermosetting resin of epoxy group | 30% |
| (weight ratio) | Carbon fiber (fiber length: 100 μ) | 30% |
|  | Inorganic filler | 40% |

The above-mentioned steel ball with a copper plating film is set in dies which are heated at a temperature of 180° C., and then the above-mentioned mixture of the thermosetting resin of an epoxy group is injected into the dies at the temperature of 90° C. under the injection pressure of 1000 Kg/cm². Forming is carried out for 80 seconds (See FIG. 1(d)) and thereafter the injected product is taken out from the dies and dipped in a peeler for metal plating called "ENSTRIP S-180 (Trade name)", which is a solvent of 30%, for 60 min. and the solvent is agitated so that the copper plating film may be peeled off and a product (A) is obtained (See FIG. 1(d)). The solvent is kept at a temperature of 70° C.

Results

The steel ball 1, which is molded in the supporter 2, has a smooth rotation. The clearance 3 between the plastic supporter 2 and the steel ball 1 forms about 5 to 6 μm.

(Second Embodiment)

Figure 20:
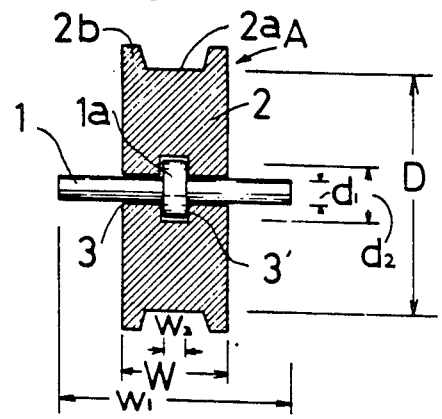

Next, it is described about an embodiment of a pulley with a shaft (A) which pulley is constructed in such a manner that a guide pulley 2 having a flange 2b on its side, is molded on a steel rotary shaft 1 having a large diameter portion 1a at an intermediate portion thereof in the axial direction, as shown in FIG. 20.

Steel rotary shaft:

| Size of the shaft | Diameter of the shaft(d1) 2 mm, |
| --- | --- |
|  | Diameter of the intermediate large portion(d2) 2.2 mm, |
|  | Length of the shaft(w1) 20 mm, |
|  | Width of the intermediate large diameter portion(w2) 2 mm |
| Film | Copper plating thickness 18 μ |
| Forming material | Polyacetal thermoplastic resin |
| (weight ratio) | (Carbon fiber 15% contained) |
|  | Size of pulley... Outer diameter(D) 10 mm, Width(W) 15 mm |

The steel rotary shaft 10, the entire periphery of which is coated with the copper plating film 4, is set in dies which are heated at a temperature of 80° C., and a polyacetal thermoplastic resin is injected into the dies at a temperature of 190° C. under an injection pressure of 600 Kg/cm². Forming is made by cooling for 30 seconds and then the injected steel rotary shaft 1 is taken out from the dies. Thereafter, it is set in a pressure chamber containing a peeler for metal plating called "ENSTRIP S-180 (Trade name)" which is an aqueous solution of 30% and kept at a temperature of 70° C. Then, the copper plating film 4 is peeled off while the aqueous solution is agitated, so that a product (A) (a pulley with a rotary shaft) may be obtained.

Result

A rotary shaft (A) of high precision has been obtained in which the plastic supporter (pulley) 2 is molded on the steel rotary shaft 1 which is able to rotate thereon smoothly. The clearances 3, 3' (see FIG. 20) between the rotation surfaces of the rotary shaft 1 and the pulley 2 and in the direction of the axis of the rotary shaft, are estimated about 3 to 4 μm, respectively. It seems that these clearances are small in comparison with the thickness of the plating film 4 due to contraction of the plastic material of the supporter.

(Third Embodiment)

Next as an embodiment of a pulley with a rotary shaft (A), which is described in the second embodiment with reference to FIG. 20, in which the material of the shaft, the material of the coating film and the plastic material are varied.

Rotary shaft of stainless steel

| Size of the shaft | Diameter of the shaft(d1) 10 mm, |
| --- | --- |

|  | -continued | |
|---|---|---|
|  | Diameter of intermediate large portion(d2) 12 mm, Length of the shaft(w1) 60 mm, Width of intermediate large portion(w2) 6 mm | |
| Film | | |
|  | Polyimide coating | Film thickness 15 μ |
| Forming material (Weight ration) | Polypropylene thermoplastic resin (Carbon fiber 35% contained) Size of pulley | Outer diameter (D) 25 mm, Width(w) 25 mm |

The stainless steel rotary shaft 1, the periphery of which is coated with a polyimide coating film 4, is set in dies which are heated at a temperature of 30° C. The polypropylene thermoplastic resin is injected into the dies at a temperature of 200° C. under an injection pressure of 600 Kg/cm². Forming is made for 30 second cooling and then the shaft is taken out from the dies. Then, it is dipped in a solvent of N;N-dimethylformamide, which is heated at a temperature of 50° C. The polyimide coating 4 is removed while agitating the solvent for 60 min., so that a product (a pulley with a rotary shaft)

(A) may be obtained.

Result

The plastic supporter (pulley) 2 molded on the stainless steel rotary shaft 1, may be smoothly rotated, so that the pulley with the rotary shaft (A) of high precision may be obtained. It seems that the small clearances 3, 3' between the rotation surfaces of the rotary shaft 1 and the pulley 2 and in the direction of axis of the rotary shaft 1, are about 2 to 3 μm. The small value of the clearances 3, 3' results in contraction of the plastic material of the supporter.

(Embodiments of molding)

Next, it is described about molded articles obtained according to the present invention.

Figure 2:
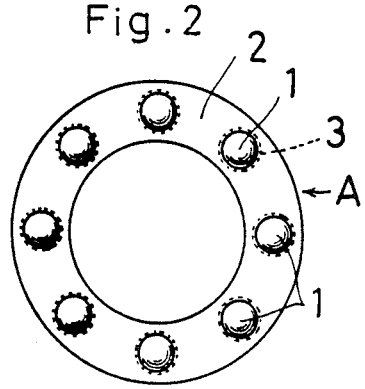
FIG. 2, FIG. 4, FIG. 6 and FIG. 8 are plan views of bearing parts, respectively.
Figure 3:
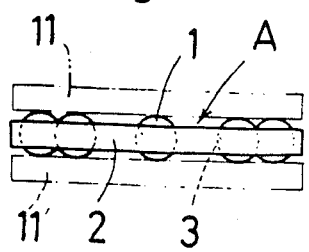
FIG. 3 is a side view of FIG. 2.

The embodiments shown in FIGS. 2 and 3, disclose a typical molded articles which use a steel ball 1 shown in the first embodiment. This is obtained in such a manner that a number of steel balls 1 having copper plating films are held in dies by leaving a predetermined distance therebetween in the direction of the periphery and that a plastic supporter 2 in the shape of a flat ring by injection and then the copper plating film is removed so as to form a ball box (A) in a thrust ball bearing. The ball box (A) formed in this manner, may be used in the state that it is held between upper and lower races 11, 11', as shown in FIG. 3.

Figure 4:
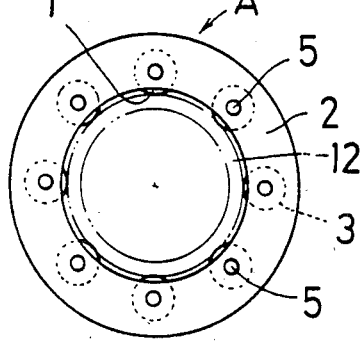
Figure 5:
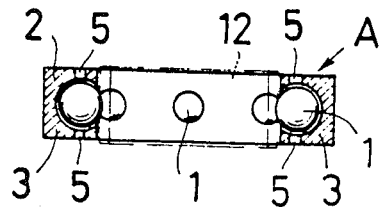
FIG. 5 is a side view of FIG. 4, broken away at a center line.

The embodiments shown in FIG. 4 through FIG. 8 relate to bearings of radial type. The bearings shown in FIGS. 4 and 5 are obtained in such a manner that a number of steel balls 1, which are coated with copper plating via supporting openings 5 shown in the drawings, are held in dies by leaving a predetermined distance therebetween in the direction of the periphery in a plane and that only the inner surface of each of the balls are stopped by the dies so as to form a plastic supporter 2 by injection and then the copper plating film is removed in the same manner, so that a particular ball box (A) may be formed seamlessly to be one body in which the outer race and the ball box in the ball bearing of radial type are united. The ball box (A) formed in such a manner may be used by setting same on a rotary shaft via an inner race 12 or directly, as shown in phantom lines in the drawings.

Figure 6:
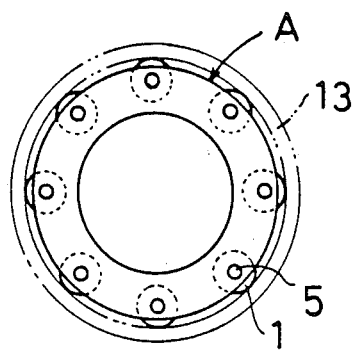
Figure 7:
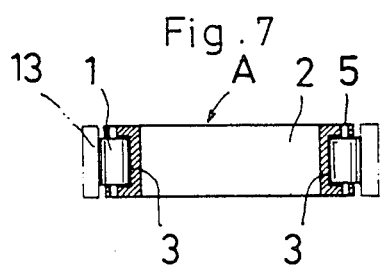
FIG. 7 is a side view of FIG. 6, broken away at a center line.

Shown in FIGS. 6 and 7 are roller bearings of radial type. As mentioned above, steel rollers 1 are surrounding by a plastic material and then an inner race and a ball box are united to each other so as to make a particular ball box (A) seamlessly in one body.

Figure 8:
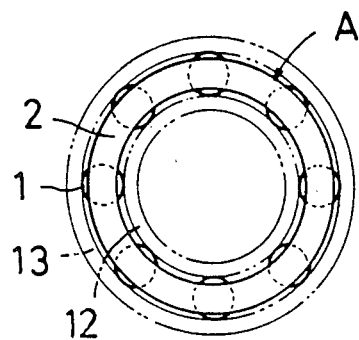

Shown in FIG. 8 is a ball bearing of radial type. This is also formed in the same manner, i.e. by surrounding a steel ball 1 with a plastic material so as to form a ball box (A) of normal type seamlessly in one body.

Figure 9:
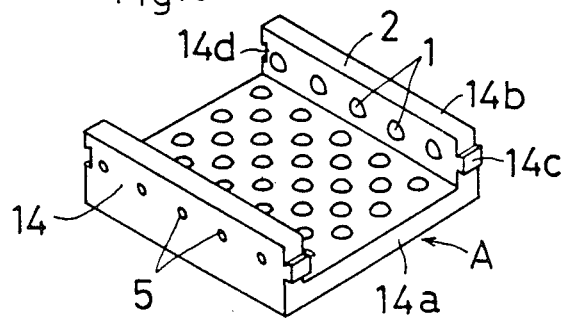
FIG. 9 is a perspective view of a ball conveyer block.

Shown in FIGS. 9 and 10 are the same as those embodiments shown in FIG. 4 through FIG. 7. Namely, a part of a steel ball with copper plating 1 is set in dies to project from a plastic supporter, and a block (A) of a ball conveyer a obtained by removing the copper plating film after molding, hold the steel balls such that the steel balls 1 are embedded in the bottom wall 14a of the conveyer and right and left guide walls 14b, 14b thereof to project a part of each of the steel balls from the surface of the cage. Further, a dove-tail projection 14c and a dove-tail groove 14d are formed with an end portion of the right and left guide walls 14b, 14b in the longitudinal direction thereof, so that they may be used by connecting same in the longitudinal direction, as shown in FIG. 10.

Figure 13:
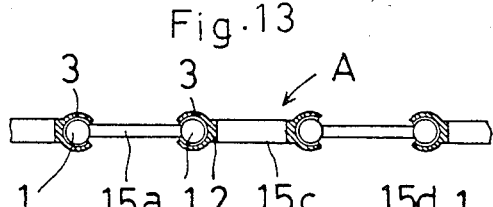
FIG. 13 is a side view of a chain broken away at a center line.
Figure 14:
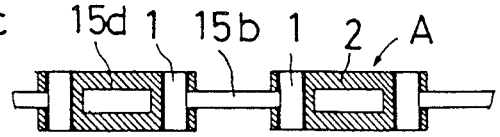
FIG. 14 is a plan view of the chain broken laterally.

Shown in FIGS. 11 and 12, are roller conveyers (A) which are constructed such that a number of rollers 1 of brass are arranged parallel to one another in such that the upper portions of the rollers project from a plastic supporter 2 through a molding process. Numeral 16 shows an article to be transferred in the drawing, FIGS. 13 and 14 show a chain respectively. FIG. 13 shows a ball chain (A) which is formed such that ball portions 1, 1 are formed on both of the ends of a bar portion 15a unitedly and the coating film on the ball portions is removed after these ball portions 1, 1 are connected to one another with plastic material by molding process, as shown in FIG. 15 and FIG. 16. FIG. 14 shows a chain of roll type (A) which is formed such that column bodies 1, 1 are connected to both of the ends of an intermediate connecting portion 15b to make an H-letter in plan view by using steel and then these columns 1, 1 are molded with plastic material so as to be connected to one another. Numerals 15c, 15d are openings formed with the supporter 2 so as to engage with a wheel tooth for the chain.

Shown in FIGS. 15 and 16 are casters (A) which are formed such that a steel ball 1 is molded with plastic material and also an attaching portion 17 to implements or devices is formed unitedly with molding material. FIG. 15 shows the caster (A) which has the ball 1 located on the central line of the attaching portion 17, and FIG. 16 shows the caster (A) in which the attaching portion 17 is arranged on the ball 1 in such a state that the center line of the attaching portion goes through a center of the ball.

Figure 17:
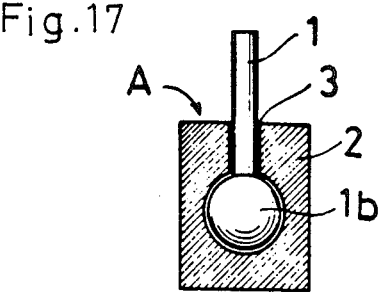
FIGS. 17 through 23 are side views showing the essential portions of products broken away at a center line, respectively.

FIG. 17 shows a rotary body (A) which is constructed such that a ball 1b is formed at the lower end of a rotary body 1 of brass integrally and that the entire periphery of the ball 1b and a part of the periphery of the rotary shaft 1 are molded unitedly. As shown in the drawing, heavy load acting on the shaft in the upper and lower directions, may be supported by the ball 1b.

Figure 18:
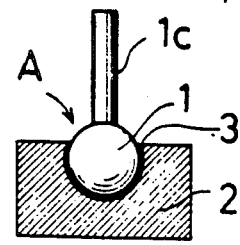

FIG. 18 shows a universal joint which is constructed such that a ball of brass 1 connected to a bar 1c is molded with plastic material except the connection side of the bar 1c.

Figure 19:
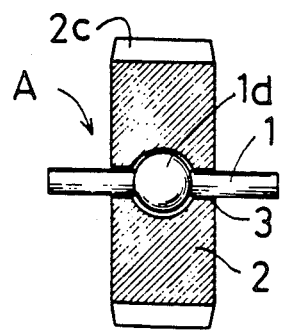

FIG. 19 shows a gear with a rotary shaft (A) which is constructed as follows. A ball 1d is formed integrally with an intermediate portion of a rotary shaft 1. The ball 1d and a part of the rotary shaft 1 are molded unitedly with plastic material and teeth 2c are formed on the periphery of the molded body.

Figure 21:
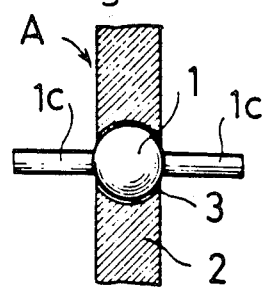

FIG. 21 shows a rotary body (A) which is constructed such that only the periphery of a ball 1 is molded with plastic material by leaving two portions of the ball to which each end of the rotary shaft 1c, 1c are connected in the same manner of FIG. 19.

Figure 22:
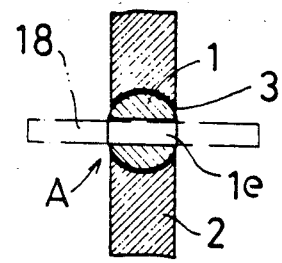

FIG. 22 shows a rotary body (A) which is molded in the same manner as that of FIG. 21, by using plastic material. Namely, a steel ball 1 having an opening 1e for inserting thereto a shaft 18 is molded, so as to make a supporter 2 swingable with respect to the shaft 18 and rotatable while the supporter may be slidable in the direction of axis of the shaft 18.

Figure 23:
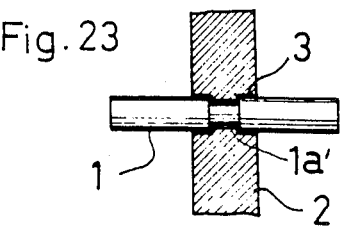

FIG. 23 shows a rotary body (A) in which an intermediate portion of a stainless steel rotary shaft 1 is formed to be a small diameter portion 1a'.

As is clear from the above description, the material of coating film coating the rotary body of hard material 1 may be selected from those which may be removed by a solvent, which damages both of the molding plastic material 2 and the rotary body of hard material 1, after molding. Therefore, the coating film may be made by ceramic. Further, the material of the rotary body 1 may be not only metal, but also ceramic.

Further, as a mixing material to the plastic material of the plastic supporter, it may be used such as carbon fiber, carbon spheres, graphite, graphite spheres, titanic acid potassium, molybdenum disulfide and so forth. These materials may be used single or in combination to make a mixture of plastic materials.

Although the preferred embodiments of this invention are described above, this invention cannot be defined or limited to the constructions of these embodiments and may be modified within a scope of this invention which may achieve the objects of this invention and bring the advantages of this invention.

What is claimed is:

1. A product by process for forming a bearing construction having at least one rotary body, which comprises coating said at least one rotary body with a removable coating film having a thickness of from about 8μ to about 15μ, positioning said at least one coated rotary body within a fixedly supporting holder means with at least a portion of said at least one coated rotary body arranged to extend beyond at least one surface of said holder means, and removing said removable coating film from said at least one coated rotary body, thereby leaving a spacing of from about 2 μm to about 6 μm between said at least one rotary body and said holder means in order to form said bearing construction with a spacing between said at least one rotary body and said holder means for free rotation of said at least one rotary body relative to said holder means.

2. A bearing construction as claimed in claim 1, wherein said at least one rotary body is a ball.

3. A bearing construction as claimed in claim 2, wherein said holder means surrounds a periphery of said ball more than one fourth the circumference thereof.

4. A bearing construction as claimed in claim 2, wherein said coating film has a thickness on the order of 8 microns.

5. A bearing construction as claimed in claim 1, wherein said at least one rotary body is a roller.

6. A bearing construction as claimed in claim 1, wherein said at least one rotary body is a rotary shaft.

7. A bearing construction as claimed in claim 1, wherein said coating film is a ceramic film.

8. A bearing construction as claimed in claim 1, wherein said coating film is a copper plating.

9. A bearing construction as claimed in claim 8, wherein said coating film has a thickness on the order of 18 microns.

10. A bearing construction as claimed in claim 1, wherein said coating film is a polyamide coating.

11. A bearing construction as claimed in claim 10, wherein said coating film has a thickness on the order of 15 microns.

12. A bearing construction as claimed in claim 1, wherein said holder means is comprised at least partially of a plastic thermosetting resin.

13. A bearing construction as claimed in claim 1, wherein said at least one rotary body comprises a gear.

14. A bearing construction as claimed in claim 1, wherein said holder means is a guide pulley.

15. A bearing construction as claimed in claim 1, wherein said at least one rotary body comprises a uniformly arranged series of rotary bodies.

* * * * *